W. B. WESCOTT.
APPARATUS FOR HEATING CEMENT COATED FABRICS.
APPLICATION FILED AUG. 28, 1912.
1,124,566.
Patented Jan. 12, 1915.
2 SHEETS—SHEET 2.
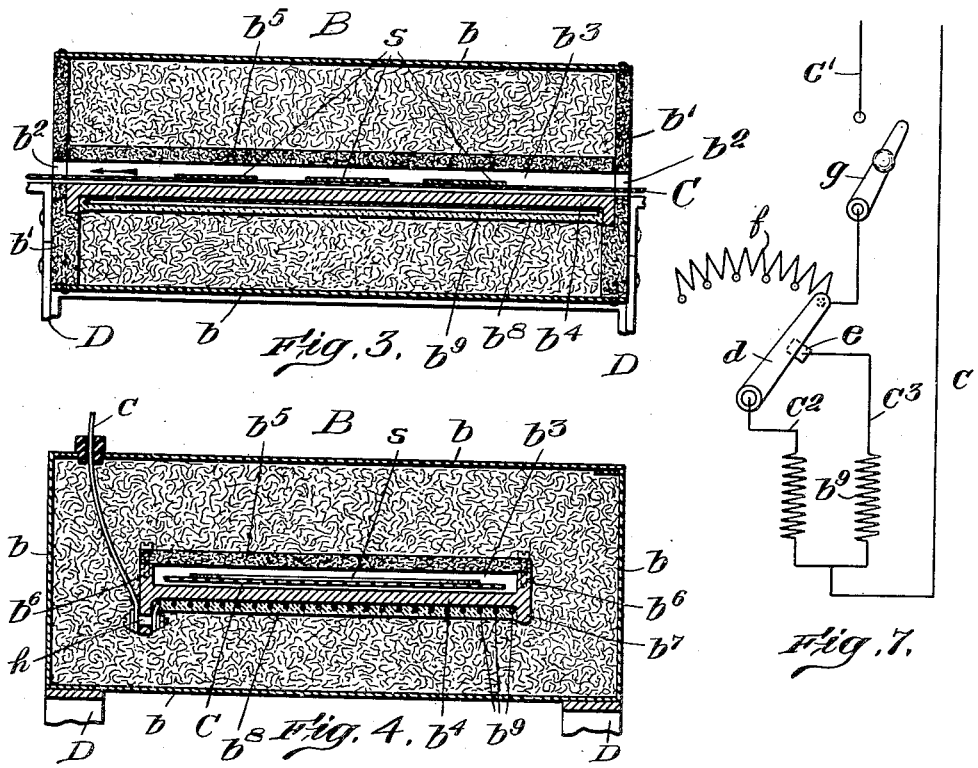
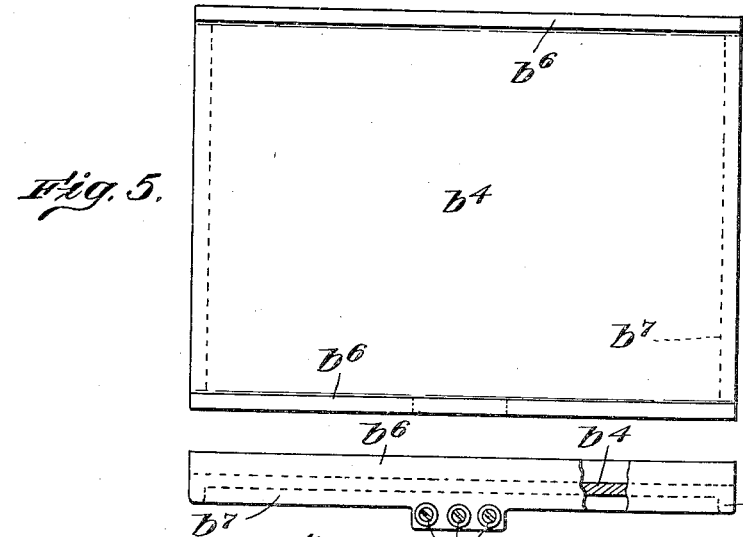
Witnesses:
Josephine H. Ryan
Ruby Banfield
Inventor:
William Burton Wescott,
By Roberts, Roberts & Cushman
Attorneys.

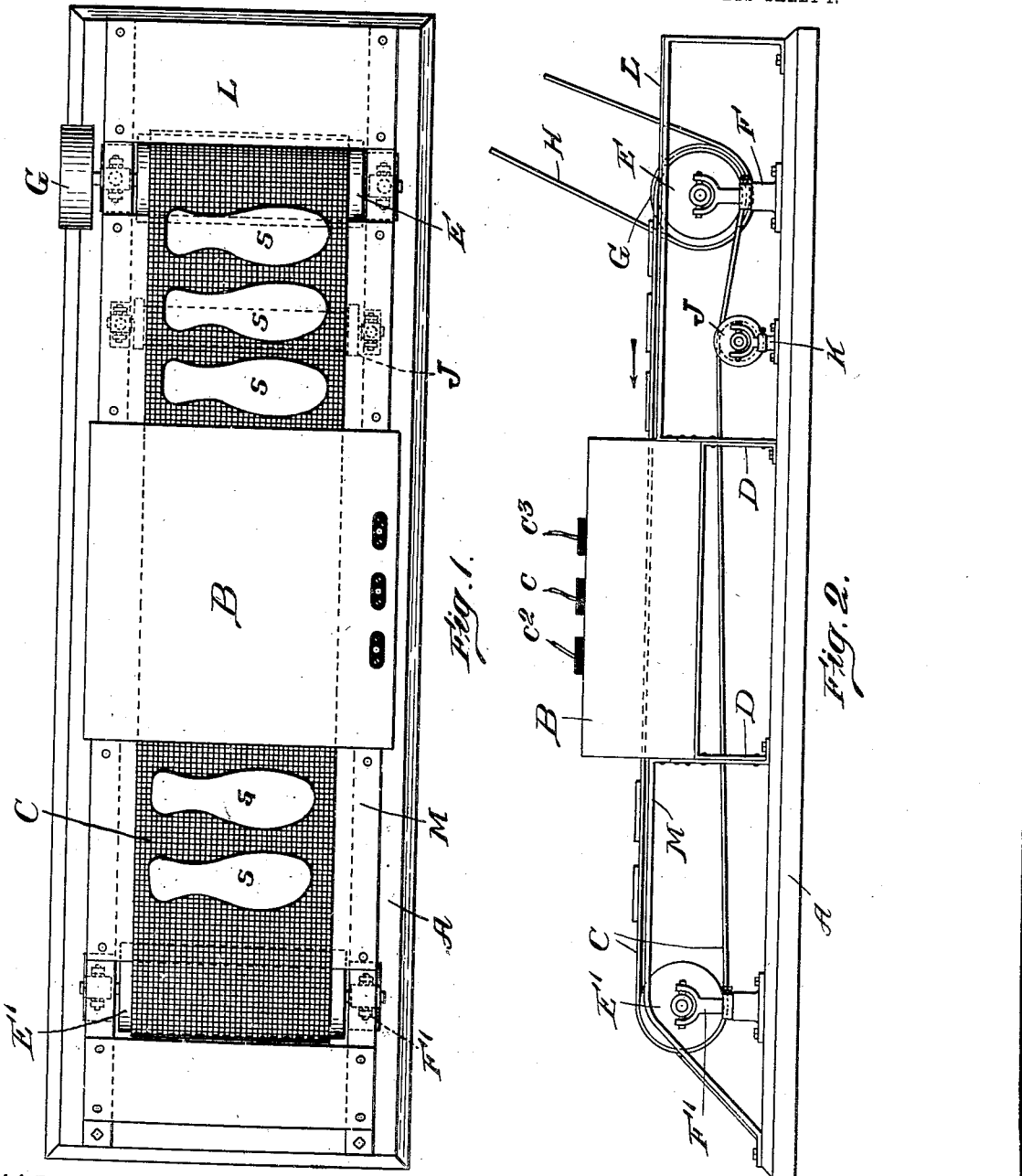

UNITED STATES PATENT OFFICE.

WILLIAM BURTON WESCOTT, OF BOSTON, MASSACHUSETTS, ASSIGNOR TO WALPOLE SHOE SUPPLY COMPANY, OF BOSTON, MASSACHUSETTS, A CORPORATION OF MAINE.

APPARATUS FOR HEATING CEMENT-COATED FABRICS.

1,124,566.    Specification of Letters Patent.    Patented Jan. 12, 1915.

Application filed August 28, 1912. Serial No. 717,479.

*To all whom it may concern:*

Be it known that I, WILLIAM BURTON WESCOTT, a citizen of the United States, and resident of Boston, in the county of Suffolk and State of Massachusetts, have invented new and useful Improvements in Apparatus for Heating Cement-Coated Fabrics, of which the following is a specification.

This invention relates to apparatus for heating and softening the cement of cement-coated fabrics, and particularly to such apparatus for treating blocked soles, so-called, used in the manufacture of composite, reinforced insoles known in the trade as " gem insoles."

A " gem insole " is composed of a blank of leather cut in the proper shape, and a reinforcement of canvas, duck, or other suitable cloth, called a " gem duck " sole, cut out or blocked out to correspond to the shape of the leather blank, and secured to the leather by a cement of a rubber compound. The cloth from which said blocked soles are made is coated with this rubber cement, which at ordinary temperatures is not sticky or tacky, but which on being heated is brought to the required viscous and sticky consistency to glue the blocked cloth sole and the leather sole together.

Various methods have been used of heating the cement-coated fabric, and applying it to the leather blank, but all have been open to serious objection. For example, strips of the cement-coated gem duck have been heated by drawing them across a hot plate to soften the cement, and the leather blanks then laid on and pasted to the cement covered side of the strip. Afterward the strip is cut off, the various well known forming-in operations are performed and the edge of the cloth is trimmed about the leather blank. This method is extremely wasteful of the cloth in the trimming. The better practice is to block out the canvas to fit the leather soles, heat the cement covered blocked soles, and apply them ready-cut to the leather blanks instead of gluing the blanks to the uncut cloth strip. Serious difficulties have been encountered, however, in performing this method with the apparatus hitherto used. The blocked soles have been heated on an open heater-plate or table, and when laid on the plate, cement side up, the sole immediately curls up under the influence of the heat, with the result that the parts in contact with the plate are heated too much, and the parts out of contact do not get properly heated. When the whole sole becomes sufficiently warmed it will flatten out again and lie on the heater plate, but the cement on the parts first in contact with the plate will then often have volatilized and lost its tackiness, before the cement on the other parts has been brought to the proper consistency. Furthermore, it is difficult for the operator to pick the heated soles off the hot plate without being burned, and the intense heat of the open and exposed plate also inflicts serious discomfort on the operator, who has to work directly over it. It is not possible to reduce the heat of the plate sufficiently to obviate this discomfort, and the danger of burns, because the cement must be brought to the desired consistency quickly, as it will volatilize if heated slowly.

My new apparatus permits the application of heat simultaneously to the two sides of the cement coated fabric, in such relative quantities that the temperature of the exposed or outer side of the cement coating and the temperature of the under side or cloth side of the cement coating, will be raised at a substantially uniform rate. And with my new apparatus it is possible to heat the cemented blocked sole, uniformly, quickly and to the proper consistency, wholly avoiding the deleterious effects of unequal heating due to the curling, above mentioned, and wholly avoiding the danger to the operator of burns in handling the work, and the discomfort indicated of working over an open heater.

In the accompanying drawings, which illustrate one embodiment of the invention, Figure 1 is a plan view of an apparatus for heating gem duck soles, exemplifying the invention; Fig. 2 is a side view of the apparatus shown in Fig. 1; Fig. 3 is a longitudinal, vertical, section, enlarged, of the heater chamber; Fig. 4 is a vertical cross section of said heater chamber; Fig. 5 is a plan view of the heater plate forming the floor of said chamber; Fig. 6 is a side view of said heater plate; and Fig. 7 is a diagrammatic illustration of a system of electrical control for the resistance coils of the heater plate.

Referring to the drawings, A represents a base or support on which all of the parts are mounted.

B represents the heater, and C represents the work carrier or conveyer which travels through the heater. The heater B is supported above the base A by standards or legs D, and the carrier C, consisting as herein shown of a belt conveyer, is mounted on rollers E, E', supported by standards F, F', one at either side of the heater. The carrier is driven in the direction of the arrow by a pulley G, fast to one of the rollers, E, and a belt H, connected with some convenient source of power. The standards F, F', are each made in two sections, as shown, the upper section telescoping the lower section so that the carrier belt may be adjusted vertically with relation to the heater chamber through which it passes. Set screws are provided in said standards to hold the same in adjusted position.

J represents a tension roller mounted on standards K which are vertically adjustable in the same manner as standards F, F' to vary the tension of the belt C.

The heater B comprises an outer casing having metal top, bottom and side walls $b$, and end walls $b'$ of asbestos or some similar heat-insulating material. The end walls $b'$ are each horizontally slotted at $b^2$ to provide an open passage through the heater for the belt C. Between said slots $b^2$, $b^2$ is a heater chamber $b^3$, formed between a metal heater plate $b^4$, which constitutes the bottom wall or floor of the heater chamber, and a top wall or ceiling of asbestos or other heat-insulating material $b^5$, above and in close proximity to the heater plate $b^4$. The heater plate $b^4$ is made with two upwardly extending flanges $b^6$, one at each side, forming the side walls of the chamber $b^3$. Thus a shallow heater chamber is provided, closed at all sides excepting at its two opposite ends where the slots $b^2$, $b^2$ afford openings for the passage of the carrier C. Downwardly extending marginal flanges $b^7$ are also provided on the heater plate, and on the under side of said plate, within said flanges, is a layer of enamel or the like, $b^8$, in which are embedded resistance coils $b^9$. The heater plates rest on shoulders provided therefor in the asbestos end walls $b'$ of the outer casing. The space between the walls of the heater chamber and the walls of the outer casing is filled with a filler of heat insulating material, such as a mixture of magnesia and asbestos fibers, lightly packed into the space.

There are preferably two heater coils $b^9$ and the wiring therefor may be as diagrammatically shown in Fig. 7, wherein $c$ represents one line of the main circuit and $c'$ the other line. The line $c$ is the common lead of both coils $b^9$. One of the said coils is connected by wire $c^2$ with a rheostat arm or controller $d$, and the other coil is connected by wire $c^3$ with a contact piece $e$. The rheostat arm $d$ travels over spaced contacts in a resistance coil $f$, one end of which is connected with a main switch $g$ in line $c'$. In order to heat the apparatus quickly, both coils $b^9$ are thrown in circuit by moving the rheostat arm $d$ to the position shown in the drawings, in engagement with contact $e$, and with all the resistance $f$ cut out. It is assumed, of course, that the main switch $g$ is closed. Current will then pass directly from the main circuit through both heater coils $b^9$. As soon as the desired temperature has been attained, the arm $d$ is moved out of contact with the contact $e$, thereby cutting out one of the heater coils $b^9$, and increasing the resistance, which however permits a sufficient flow of current to maintain the necessary temperature. The temperature may be further lowered and regulated by moving the rheostat arm $d$ to cut in more or less of the resistance coil $f$.

The heater plate $b^4$ is provided with three binder posts $h$ connecting the heater coils $b^9$ with the three conductors $c$, $c^2$ and $c^3$, which pass through insulated openings in the wall $b$ of the outer casing. The controller $d$ and resistance $f$, and the main switch $g$ may be located at any convenient place near the apparatus but not necessarily on the apparatus itself.

The carrier belt is made of some heat conductive material, and preferably of copper wire cloth or screening, and is so adjusted that in passing through the heater chamber $b^3$ it makes contact with the heater plate $b^4$. It is shown for the sake of clearness in Figs. 3 and 4 of the drawings, separated a little from the plate, but it will in practice rest upon the plate, so that being a good conductor of heat, it will heat instantly upon entering the heater chamber, and will conduct heat to the work. Also the wire belt will cool very quickly upon emerging from the heater, and will carry away comparatively little heat.

When the plate $b^4$ has been brought to the proper temperature (about 300° to 310° centigrade), and the carrier belt started, the operator lays the gem duck soles or blocked soles, $s$, cemented side up, on the moving carrier which carries them into the heater at one end and out at the other end. The travel of the belt C is timed so that each sole is in the heater about fifteen seconds. The maximum temperature within the heater chamber is in the zone at the bottom of the chamber adjoining the heater plate. The middle zone is cooler; and the upper zone near to the top wall of the chamber is again hotter. When a sole enters the heater chamber it immediately starts to curl away from the wire belt. In so doing the curled portions come into the hot area at the top of the shallow chamber, which so far softens the cement that the sole promptly drops back again and lies flat on the belt. It has been actually found in practice that the curling sole never touches the top of the chamber, because the curling tendency is immediately counteracted when the sole comes into the hot zone at the top of the chamber.

It is important that the carrier C pass through the heater chamber in contact with the heater plate for several reasons. In order that the cement may be heated evenly and uniformly, the heat on the canvas side of the sole must be greater than on the cement side, since if the temperature were the same on both sides the top surface of the cement would be overcooked before the heat could strike through the canvas and reach the under side or cloth side of the cement coating. This result is accomplished by having the carrier made of heat conductive material, and in contact with the heater plate, so that the maximum temperature is applied to the canvas side of the sole, which acts to a certain extent as a barrier to the heat. The cemented side of the sole lies in a zone of comparatively lower temperature than the surface in contact with the canvas, with the result that the cement is heated substantially evenly and at a uniform rate on the exposed side and on the side next to the canvas. If the carrier passed through the chamber out of contact with the plate, the carrier would not become sufficiently heated to heat properly the under surface of the cement through the canvas; and the top or exposed surface of the cement which would then lie in the hot upper zone of the heater would be burned.

When the soles emerge from the heater, the cement has been brought to the desired tacky consistency, uniformly throughout its whole mass, and without any spots being over-cooked. Instead of sending the cement coated soles through the heater on a carrier, the cement coated fabric, either in the form of a strip or of a series or chain of soles linked together edge to edge, may be drawn through the heater chamber, or otherwise passed into and out of the heater chamber, directly in contact with the heated floor. The work will then be subjected to the same treatment as when it is carried into and out of the heater chamber on a carrier of heat conductive material resting on the heated floor.

Whether a carrier be used or not, and whether the apparatus used be the same as that herein shown or not, the essential conditions to be observed in performing my method are that heat be applied simultaneously to the two sides of the cement coated fabric in such relative quantities that the temperature of the exposed or upper side of the cement and the temperature of the under side or cloth side of the cement shall be raised at a substantially uniform rate. As the under side or fabric side of the cement coating has to be heated through the fabric, more heat must be applied to that side of the fabric than to the coated side, in order that the temperature at the two sides of the cement coating may be approximately the same. The conditions necessary to perform my method are admirably fulfilled by the apparatus above described, the essential characteristic of which is the low, shallow heater chamber formed between the heated floor, and the ceiling above and in close proximity to the floor, which confines or deflects sufficient heated gas or air, radiated from the floor, to maintain an area of hot gas immediately above the cement coated fabric, and close enough thereto to heat the top surface of the cement while the under surface of the cement is being heated directly from the floor through the fabric, which may rest on the hot floor or on a carrier of heat conductive material in contact with the floor. Thus while the heat applied to the cloth side of the material directly from the floor is greater than that applied to the cement side from the area of heated gas maintained by the ceiling, the temperature at the upper and under sides of the cement coating will be approximately the same, and the cement will be softened evenly and uniformly throughout.

It will be seen that in the apparatus shown in the drawings, the belt carrier extends substantially beyond the heater at each end to afford room for laying on the soles before they pass into the heater, and for taking them off after they come out. A table L may be provided at the intake end of the machine on which the soles to be treated may be stacked; and underneath the outcoming portion of the belt is a table M forming a rigid support for the work on that part of the carrier, so that the operator may remove the soles s by pressing thereon the leather blanks, which will adhere to the sticky cement and pick up the blocked cloth soles.

Not only is the heating and softening of the cement more uniformly and perfectly accomplished than has been possible with apparatus heretofore in use, but as the heater plate is covered or confined instead of being exposed, and as the heater chamber is thoroughly heat insulated, the apparatus is cool and comfortable to work over; and there is no danger of being burned in taking the soles off the belt as the meshed wire fabric of which the belt is made cools almost instantly upon coming out of the heater.

I claim:

1. In an apparatus for heating cement-coated fabric, a heater chamber having a floor of heat conductive material adapted to heat the cement-coated fabric by conduction, means to heat the floor, a ceiling above and in close proximity to said floor adapted to maintain an area of gas heated by convection from the floor on the cement-coated side of said fabric, whereby the top surface of the cement will be heated by said heated gas while the under surface of the cement is being heated through the fabric by conduction from the heated floor, said apparatus being adapted to maintain dry heat within the heater chamber and to treat the cement-coated fabric without the application of moisture thereto.

2. In an apparatus for heating cement-coated fabric, a heater chamber having a floor of heat conductive material, means to heat the floor, means to move the cement-coated fabric through the heater chamber in heat conductive contact with the floor, a ceiling above and in close proximity to said floor adapted to maintain an area of gas heated by convection from the floor on the cement-coated side of said fabric, whereby the top surface of the cement will be heated by said heated gas while the under surface of the cement is being heated through the fabric by conduction from the heated floor, said apparatus being adapted to maintain dry heat within the heater chamber and to treat the cement-coated fabric without the application of moisture thereto.

3. In an apparatus for heating cement-coated fabric, a heater chamber having a floor of heat conductive material, means to heat the floor, a carrier of heat conductive material for said fabric adapted to move in and out of said chamber in heat conductive contact with said floor, a ceiling above and in close proximity to said floor adapted to maintain an area of gas heated by convection from the floor on the cement-coated side of said fabric, whereby the top surface of the cement will be heated by said heated gas while the under surface of the cement is being heated through the fabric by conduction from the heated floor, said apparatus being adapted to maintain dry heat within the heater chamber and to treat the cement-coated fabric without the application of moisture thereto.

4. In an apparatus for heating cement-coated fabric, a heater chamber having a floor of heat conductive material, means to heat the floor, a belt carrier of wire screening for said fabric adapted both to heat quickly and to cool quickly, traveling through said chamber in heat conductive contact with said floor, a ceiling above and in close proximity to said floor adapted to maintain an area of gas heated by convection from the floor on the cement-coated side of said fabric, whereby the top surface of the cement will be heated by said heated gas while the under surface of the cement is being heated through the fabric by conduction from the heated floor, said apparatus being adapted to maintain dry heat within the heater chamber and to treat the cement-coated fabric without the application of moisture thereto.

5. In an apparatus for heating cement-coated fabric, a heater chamber having a floor of heat conductive material, means to heat the floor, means to move the cement-coated fabric through the heater chamber in heat conductive contact with the fabric, a ceiling of non-heat-conductive material above and in close proximity to said floor adapted to maintain an area of gas heated by convection from the floor on the cement-coated side of said fabric, whereby the top surface of the cement will be heated by said heated gas while the under surface of the cement is being heated through the fabric by conduction from the heated floor, said apparatus being adapted to maintain dry heat within the heater chamber and to treat the cement-coated fabric without the application of moisture thereto.

Signed by me at Boston, Massachusetts, this 23rd day of August, 1912.

WILLIAM BURTON WESCOTT.

Witnesses:
ROBERT CUSHMAN,
JOSEPHINE H. RYAN.